US006820802B2

(12) United States Patent
Biggar et al.

(10) Patent No.: US 6,820,802 B2
(45) Date of Patent: Nov. 23, 2004

(54) ONLINE CARD ACTIVATION SYSTEM AND METHOD

(75) Inventors: Lynne Biggar, New York, NY (US); Justin D. Tobin, New York, NY (US); Fred Bishop, Glendale, AZ (US); Hans-Jurgen Greiner, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 33 days.

(21) Appl. No.: 09/924,025

(22) Filed: Aug. 7, 2001

(65) Prior Publication Data

US 2002/0117541 A1 Aug. 29, 2002

Related U.S. Application Data

(60) Provisional application No. 60/272,487, filed on Feb. 27, 2001.

(51) Int. Cl.$^7$ .............................................. G06F 17/60
(52) U.S. Cl. ........................................ 235/379; 705/41
(58) Field of Search ................................ 235/379–382, 235/375, 449, 493; 705/39–41, 26, 72–76; 713/200; 379/114.2, 114.15, 114.19, 145

(56) References Cited

U.S. PATENT DOCUMENTS

| | | | |
|---|---|---|---|
| 4,792,968 A | 12/1988 | Katz | |
| 4,845,739 A | 7/1989 | Katz | |
| 4,930,150 A | 5/1990 | Katz | |
| 4,932,046 A | 6/1990 | Katz et al. | |
| 4,939,773 A | 7/1990 | Katz | |
| 4,975,945 A | 12/1990 | Carbullido | |
| 4,987,590 A | 1/1991 | Katz | |
| 5,014,298 A | 5/1991 | Katz | |
| 5,016,270 A | 5/1991 | Katz | |
| 5,048,075 A | 9/1991 | Katz | |
| 5,073,929 A | 12/1991 | Katz | |
| 5,091,933 A | 2/1992 | Katz | |
| 5,109,404 A | 4/1992 | Katz et al. | |
| 5,128,984 A | 7/1992 | Katz | |

(List continued on next page.)

FOREIGN PATENT DOCUMENTS

WO 00/26831 5/2000

OTHER PUBLICATIONS

No Author, "Credit Card Network: Credit Card Network hits the Internet", M2 Presswire, Oct. 9, 1995, 2 pgs.
No Author, "Online Credit Card Sign–Up Now Available", Internet Business News, Nov. 1, 1995, 1 page.

*Primary Examiner*—Thien M. Le
*Assistant Examiner*—Edwyn Labaze
(74) *Attorney, Agent, or Firm*—Snell & Wilmer L.L.P.

(57) ABSTRACT

A method for online account activation between a consumer having an account with a service provider interacting with at least a first computing system and a second computing system in communication with the first computing system over the first network, the method including, in one embodiment, providing a notice to the consumer to activate an account (e.g., a new card or account, a renewal card or account, a replacement card or account, or web-based service) on a network-accessible site, instructing the consumer to access the site, prompting the consumer to provide predetermined card or account information to the site and communicating the predetermined card or account information to the second computing system over the first network, allowing the at least second computing system to process the predetermined card or account information against previously stored account data and notifying the consumer on the first computing network of the activation processing results.

48 Claims, 5 Drawing Sheets

U.S. PATENT DOCUMENTS

| | | | |
|---|---|---|---|
| 5,185,787 A | 2/1993 | Katz | |
| 5,218,631 A | 6/1993 | Katz | |
| 5,224,153 A | 6/1993 | Katz | |
| 5,231,570 A | 7/1993 | Lee | |
| 5,251,252 A | 10/1993 | Katz | |
| 5,259,023 A | 11/1993 | Katz | |
| 5,297,197 A | 3/1994 | Katz | |
| 5,349,633 A | 9/1994 | Katz | |
| 5,351,285 A | 9/1994 | Katz | |
| 5,359,645 A | 10/1994 | Katz | |
| 5,365,575 A | 11/1994 | Katz | |
| 5,561,707 A | 10/1996 | Katz | |
| 5,569,897 A | 10/1996 | Masuda | |
| 5,590,038 A | 12/1996 | Pitroda | |
| 5,694,471 A * | 12/1997 | Chen et al. | 705/76 |
| 5,883,810 A | 3/1999 | Franklin et al. | |
| 5,884,271 A | 3/1999 | Pitroda | |
| 5,910,988 A | 6/1999 | Ballard | |
| 5,991,381 A | 11/1999 | Bouanaka et al. | |
| 6,014,645 A | 1/2000 | Cunningham | |
| 6,032,136 A | 2/2000 | Brake, Jr. et al. | |
| 6,032,137 A | 2/2000 | Ballard | |
| 6,122,625 A | 9/2000 | Rosen | |
| 6,173,269 B1 | 1/2001 | Solokl et al. | |
| 6,188,309 B1 | 2/2001 | Levine | |
| 6,233,608 B1 * | 5/2001 | Laursen et al. | 709/217 |
| 6,270,012 B1 * | 8/2001 | Dawson | 235/381 |
| 6,285,991 B1 * | 9/2001 | Powar | 705/76 |
| 6,363,351 B1 * | 3/2002 | Moro | 705/1 |
| 6,473,500 B1 * | 10/2002 | Risafi et al. | 379/144.01 |
| 6,488,206 B1 * | 12/2002 | Flaig et al. | 235/380 |
| 6,516,416 B2 * | 2/2003 | Gregg et al. | 713/201 |
| 6,557,759 B1 * | 5/2003 | Zolotarev et al. | 235/380 |
| 2001/0027439 A1 | 10/2001 | Holtzman et al. | |
| 2001/0032878 A1 * | 10/2001 | Tsiounis et al. | 235/379 |
| 2001/0034706 A1 * | 10/2001 | Kiser | 705/41 |
| 2002/0069364 A1 * | 6/2002 | Dosch | 713/200 |
| 2002/0120530 A1 * | 8/2002 | Sutton et al. | 705/26 |
| 2002/0152123 A1 * | 10/2002 | Giordano et al. | 705/14 |
| 2003/0004828 A1 * | 1/2003 | Epstein | 705/26 |
| 2003/0014360 A1 * | 1/2003 | Arditti et al. | 705/39 |

\* cited by examiner

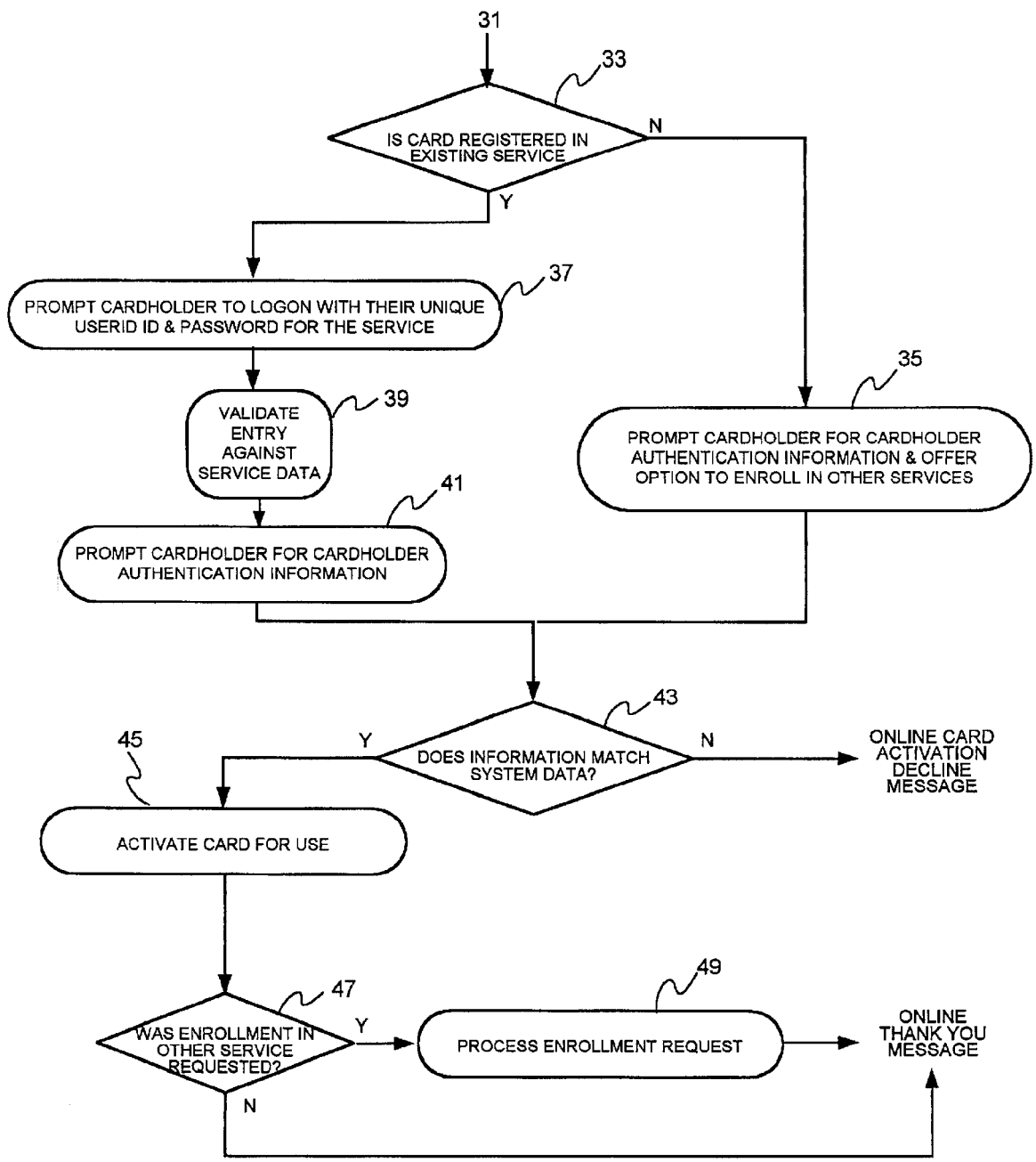

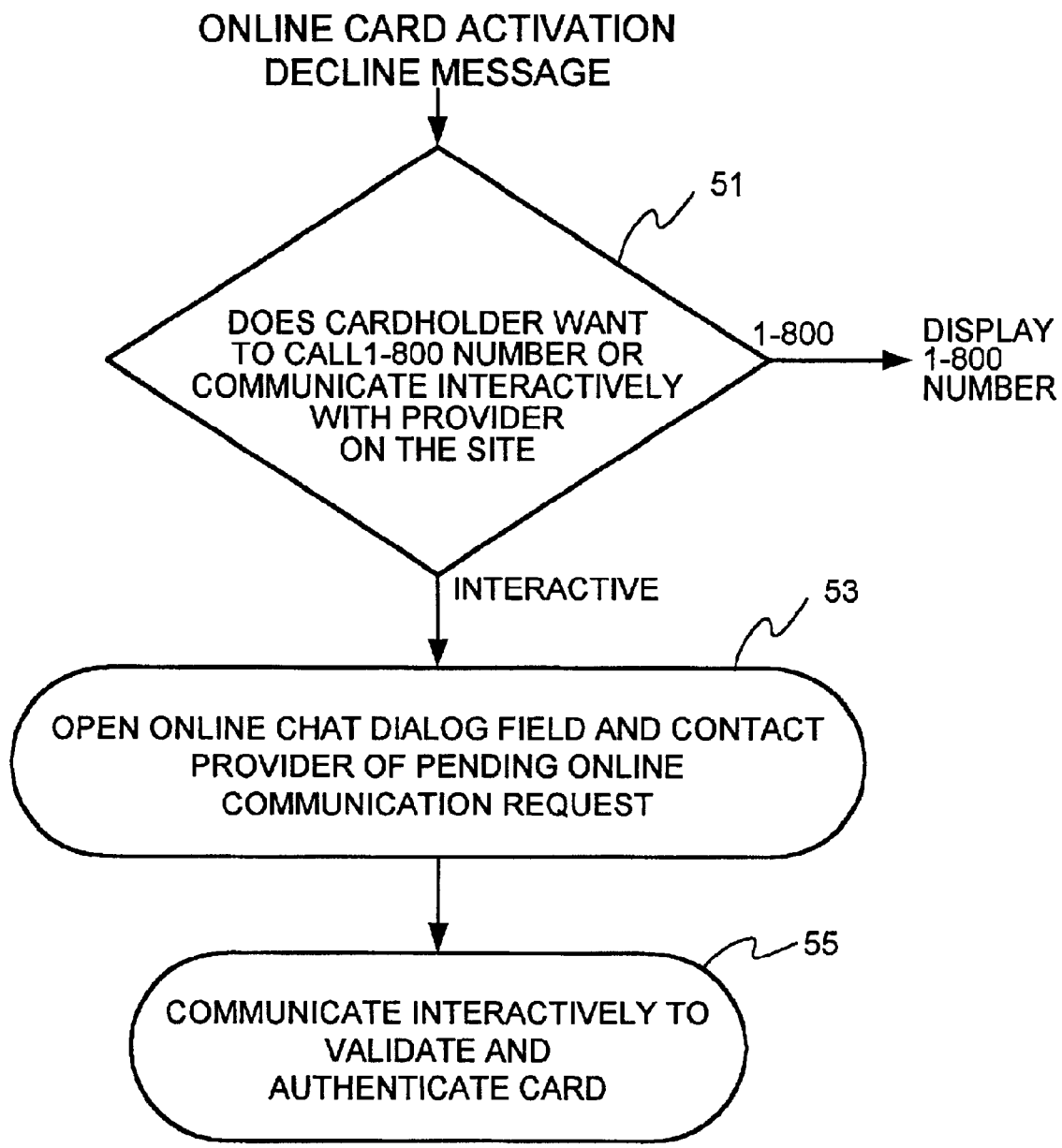

ONLINE CARD ACTIVATION SYSTEM AND METHOD

REFERENCE TO RELATED DOCUMENTS

This application claims priority to, and the benefit of, U.S. Provisional Patent Application Ser. No. 60/272,487, entitled "Online Card Activation" filed on Feb. 27, 2001, the entire contents of which are hereby incorporated by reference.

FIELD OF INVENTION

The present invention relates to activating a card or device (such as, for example, a credit card, a debit card or a cellular phone) through a computer network, and more particularly, through a site on a global computer network such as, for example, the Internet.

BACKGROUND OF THE INVENTION

In today's changing economy, people often use transaction cards such as credit cards or debit cards for numerous reasons. For example, transaction cards are lightweight and easier to carry than cash or a checkbook. Further, the need for a cardholder or consumer to carry a large amount of cash or other negotiable instruments when shopping is minimized. Cardholders also enjoy the convenience of the card's purchasing power when an unexpected expense or shopping opportunity arises. While the use of such cards has grown tremendously, the problems associated with card fraud or the use of stolen cards has also grown. As such, card providers often explore various methods or technologies to minimize card fraud or theft of the card.

The card activation process was instituted by card issuers or providers to protect themselves and the cardholder from improper use of the card before it was actually in the possession of the cardholder (i.e., through fraud or theft of the card). Card activation is typically the process for cardholders to communicate to the issuer that the cardholder has received the plastic representing their account from the issuer, and that the account is now ready to be activated so it can be used by the cardholder. Until the card is activated, it usually cannot be used for any purchases.

Typical card activation systems are provided by voice response or manual customer service systems, such as, for example, the voice response systems disclosed in U.S. Pat. Nos. 5,351,285, 5,297,197, 5,259,023, 5,251,252, 5,128,984, 5,109,404 and 5,014,298 the entire contents of which are hereby incorporated by reference as background. Both technologies are disadvantageous because, for example, voice response systems often limit the fraud identification capabilities, while manual systems usually increase cost and are not overly convenient for the customer (since the customer is typically dependent on the issuer's employee being available). Moreover, most card activation systems currently have one form and/or function. This applies not only to the system itself, but also to the different channels that are offered by card issuers to activate a card. For instance, a customer can use a voice response system to activate their card, but if any problems are encountered while using the voice response system, the cardholder is directed to a customer service representative.

SUMMARY OF THE INVENTION

An exemplary embodiment of the present invention includes a new online card activation site that will allow any consumer or cardholder with network access (e.g., Internet, WAN, LAN, etc) to activate their card or other account associated with a new account, renewal or replacement. More specifically, the present invention relates to a method for online card activation between a cardholder or consumer interacting with at least a first computing system and a second computing system in communication with the first computing system over a first network. The method includes, in one embodiment, providing a notice to a consumer to activate a card (for example, a new card, a renewal card or a replacement card) on a site on a first computing system, instructing the consumer to access the site, prompting the consumer to provide predetermined card information to the site and communicating the predetermined card information to the second computing system over the first network, thereby allowing the at least second computing system to process the predetermined card information against previously stored account data and notifying the consumer on the first computing network of the activation processing results.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

FIG. 3a is the continuing exemplary block flow diagram of the fraud process illustrated in FIG. 3; and FIG. 4 is an exemplary block flow diagram of the error messaging process of the present invention.

DETAILED DESCRIPTION

Systems and methods in accordance with various aspects of the present invention provide an online or interactive card activation process between a cardholder and a card provider. As used herein, the terms "cardmember", "card issuer", "provider", "purchaser", "customer", "consumer", and "end-user" may be used interchangeably with each other, and each shall mean any person, entity, business, machine, hardware, or software which participates in the present system for on-line activation.

Figure 1:
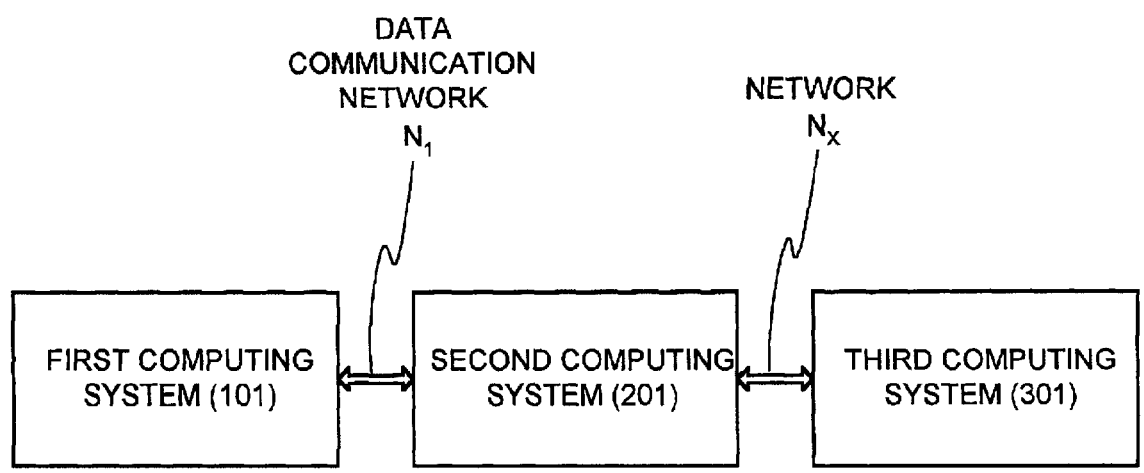
FIG. 1 is a representative block diagram of a computing system as configured for one embodiment of the present invention.

As seen generally in FIG. 1, the present invention is a system and method for online card activation between a cardholder or consumer interacting with a first computing system 101, a second computing system 201 in communication with the first computing system 101 over a first network $N_1$ (such as, for example, a data network, a local area network (LAN), a wide area network (WAN), a global computer network such as the Internet, a cardholder-accessible network or other network architectures) and optionally, a third computing system 301 in communication with the second computing system 201 over at least a second network $N_x$. (such as, for example, a payment network, LAN, WAN, the Internet or like known network architectures). The system may include a host server including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, account data, card data, merchant data, financial institution data and/or like data that could be used in association with the present invention.

The first computing system 101, in one embodiment, is a personal computer, laptop computer or like primary personal computing means. Also, in one embodiment, the first network $N_1$ is a network configured to transmit data or signals over the first network $N_1$ by conventional communication transmission means such as by wire, wireless, satellite, radio frequency, cable, DSL, fiber optic cables or any combination of these or other communication means. Those of skill in the art will realize that any data or signals traveling over the communication means are formed from any number of conventional techniques, including binary signals, analog signals, high-level software code or low-level software code, whether or not in encrypted format.

The second computing system 201 is, in one embodiment, a computer server, computer mainframe or like secondary computing means optimally configured to store, process and transmit data over any of the networks $N_1$ or $N_x$. The third computing system—301 is, in one embodiment, a computer server, computer main frame or other alternative computing means optimally configured to store, process and transmit large amounts of data over the network $N_x$ such as a payment network.

A "card" or "account number", as used herein, includes any device, code, or other identifier suitably configured to allow the consumer to interact or communicate with the system, such as, for example, a rewards card, loyalty card, charge card, credit card, debit card, prepaid card, telephone card, smart card, magnetic stripe card, bar code card, stored-value card, financial transaction card, financial instrument, cellular phone, transponder device and/or like physical device which allows a customer or consumer to access their account with the provider, authorization/access code, personal identification number (PIN), Internet code, other identification code, and/or the like. Additionally, a "card" may comprise any form of plastic, electronic, magnetic, and/or optical device which is capable of representing a cardmember account. Similarly, in an alternate embodiment, the present invention also encompasses a computer based network service (including any type of Internet web service or electronic mail account, for example) and/or like software-based algorithm which allows a consumer to access their account with the provider, authorization/access code, personal identification number (PIN), Internet code, other identification code, and/or the like. A customer account number may be, for example, a sixteen-digit credit card number, although each credit provider may have its own numbering system, such as the fifteen-digit numbering system used by American Express. Each company's credit card numbers comply with that company's standardized format such that the company using a sixteen-digit format will generally use four spaced sets of numbers, as represented by, for example, the number "0000 0000 0000 0000". The first five to seven digits are, for example, reserved for processing purposes and identify the issuing bank, card type, etc. In this example, the last sixteenth digit is used as a sum check for the sixteen-digit number. The intermediary eight-to-ten digits are used to uniquely identify the customer. Those of skill in the art will realize that other card information may also be available corresponding either to the cardholder or the card, either by placing such information on the card by known means or by storage of such information in a database.

It should be understood that the exemplary process or steps illustrated may include more or less steps or may be performed in the context of a larger processing scheme. Furthermore, the various flowcharts presented in the drawing figures are not to be construed as limiting the order in which the individual process steps may be performed.

Figure 2:
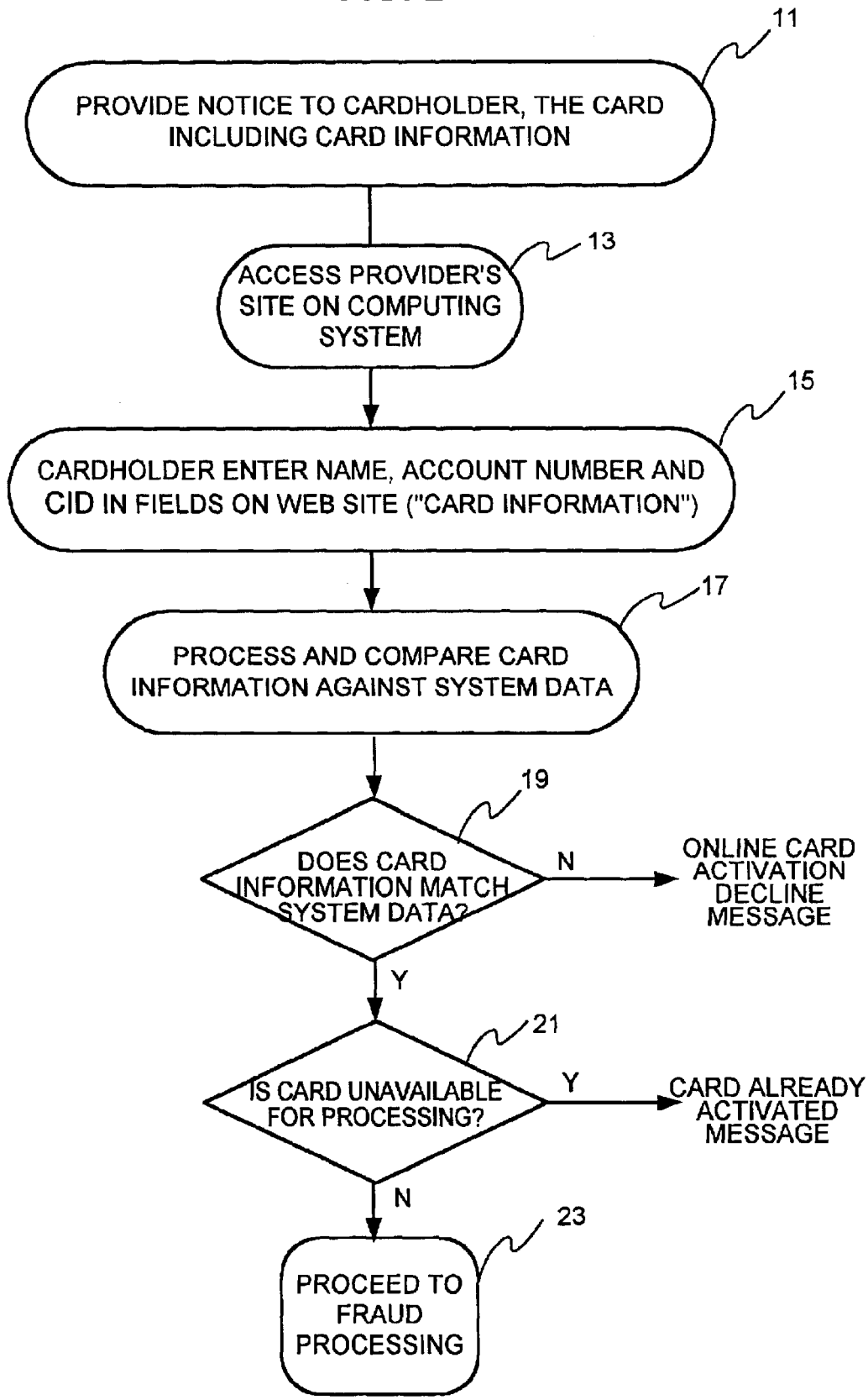
FIG. 2 is an exemplary block flow diagram of one activation embodiment process of the present invention.

In accordance with one exemplary embodiment of a method of the present invention, as seen in FIG. 2, a notice is provided to a cardholder (step 11) by, for example, a card issuer or provider (such as Bank of America, Bank One or other organizations who issue such cards as American Express, Visa, Discover or like cards). The notice can relate to, for example, a non-activated card notice associated with a new card account, a renewal card or a replacement card. The card corresponds to a cardholder account or like card information, and contains, for example, the account number, the cardholder's name, card identification number and like card information imprinted on the card.

The cardholder is provided with various methods to activate the card (including by conventional methods such as a voice response system), but the present method allows the cardholder to access a site on a computer network, and more specifically, the cardholder is instructed to access the provider's specified web site on a global computer network such as the Internet $N_x$ (step 13). The cardholder then operates the first computing system 101 to communicate with or otherwise access a site (such as, for example, a web site) on the second computing system 201 via network $N_1$ such as the Internet (step 13).

When the cardholder accesses this site, the cardholder user is prompted to provide predetermined card information to the site, such as, for example, the cardholder's name, any predetermined identifiers printed on the card (such as alpha-numeric text), the cardholder's account number with the provider (step 15) or like predetermined card information. Thus, for example, the cardholder may enter their name, account number, and card identification number (CID) as it appears on the card or account being activated. In an exemplary embodiment, the card information requested may be dynamically identified, in support of various authentication requirements of various products or services and different geographical locales, nations or treaties in effect. After the cardholder submits this information to the site, the predetermined card information is communicated to the second computing system 201 over network $N_1$. The second computing system 201 processes or compares the predetermined card information against previously stored customer data (step 17). Thus, in one exemplary embodiment, the card information is processed by comparing previously-stored database information corresponding to either the cardholder or the card with the entered predetermined card information. Alternatively, the second computing system 201 can process the information by also communicating with the third computing system 301 via the network $N_x$ to obtain any additional database information stored on the third computing system 301 corresponding to the cardholder or the card. The information stored on third computing system 301 may correspond to additional authorization and billing systems and databases. Those of skill in the art will appreciate that the second computing system 201 can also communicate with other like computing systems in communication with the network $N_x$ to obtain the same or similar information.

The second computing system 201 next determines whether the cardholder-supplied card information matches the previously stored customer data (step 19) in a database. Database may be any type of database, such as a relational, hierarchical, object-oriented, and/or like database. Common database products that may be used to implement database 103 include DB2 by IBM (of White Plains, N.Y.), any of the database products available from Oracle Corporation (of Redwood Shores, Calif.), Microsoft Access by Microsoft Corporation (of Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the class of objects defined by the key field. For example, a certain class may be designated as a key field in both the first data table and the second data table, and the two data tables may then be merged on the basis of the class data in the key field. In this embodiment, the data corresponding to the key field in each of the merged data tables is in one embodiment the same. However, data tables having similar, though not identical, data in the key fields may also be merged by using AGREP, for example.

If the card information does not match the system data as illustrated in FIG. 2, step 19, the second computing system 201 then transmits an online card activation decline message to the cardholder for display on first computing system 101 via network $N_1$. The online card activation decline message may be of any suitable text, but in one embodiment, will notify the cardholder that the card cannot be activated online for any predetermined reason, including, for example, "We cannot process your request at this time. Please call our 1-800 number for further assistance."

If the card information does match the system data as illustrated in FIG. 2, step 19, the second computing system 201 next determines whether the card is unavailable for processing, for example by determining whether the card has already been activated and/or authorized for use (step 21). If the card was previously activated or authorized for use by the provider, the second computing system 201 then displays a card already activated message to the cardholder on first computing system 101 via network $N_1$. The card already activated message may be of any suitable text such as the online card activation decline message, but preferably, the already activated message will notify the cardholder that the card cannot be activated online for any predetermined reason, including, for example, "Your card has already been activated." (step 21).

If the card has not already been activated, the second computing means next processes the card information through the fraud processing rules (step 23).

Figure 3:
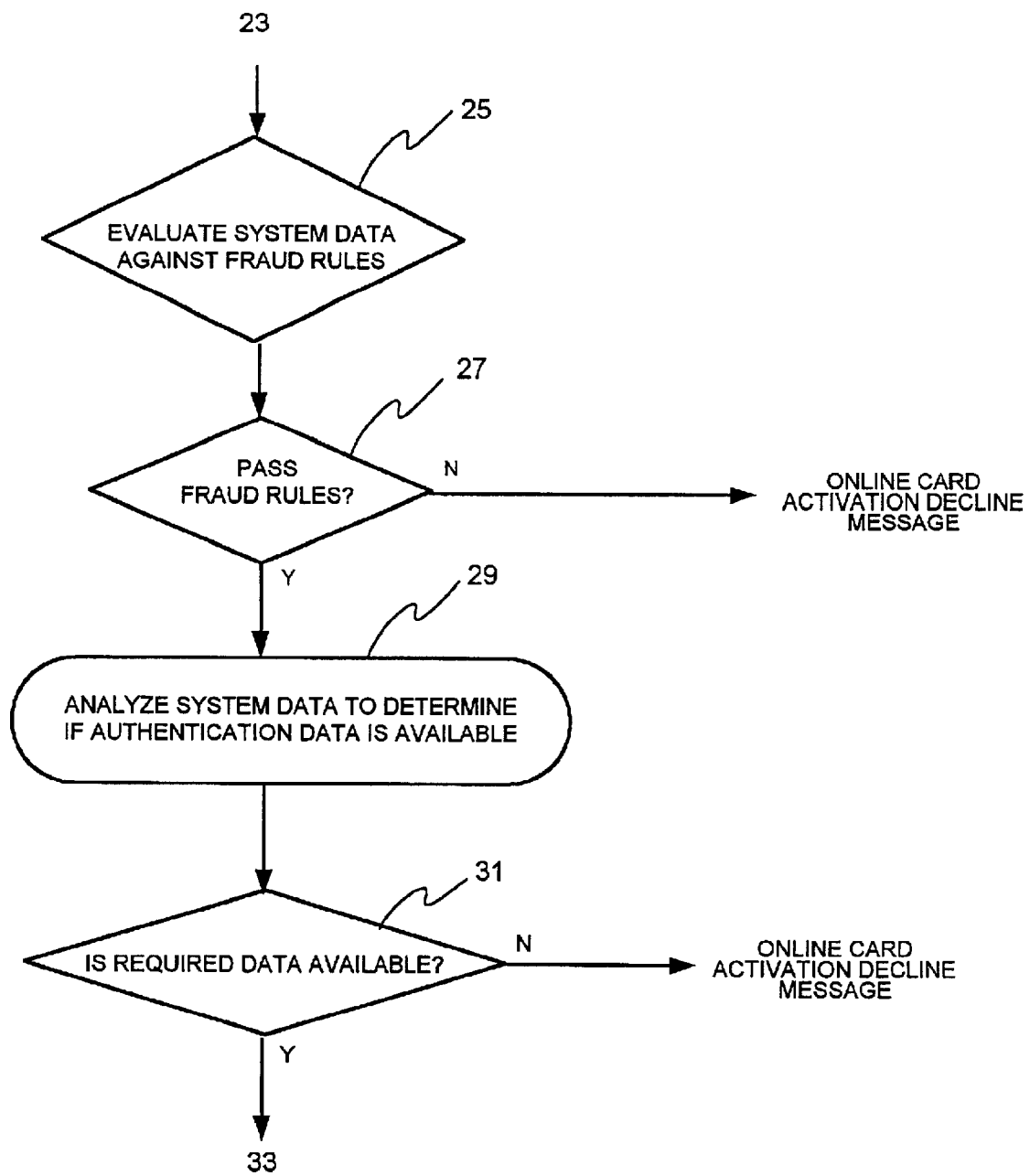
FIG. 3 is an exemplary block flow diagram of the fraud process of the present invention.

As seen by the functional blocks in FIG. 3, the fraud processing rules provide a high level process which allows the card provider to more accurately determine whether the card being activated belongs to the cardholder. The fraud rule processing may include any of several types of fraud processing known in the art which identifies that a particular activation attempt is fraudulent. As known to those of skill in the art, the fraud rule processing step is configured to minimize potential loss due to fraudulent card activations or attempts.

Referring again to FIG. 3, when the fraud processing rules are executed, the second computing system 201 uses the predetermined card information to obtain the card information and apply such information to the fraud rule processing as discussed by example above (steps 25, 27). Thus, for example, the exemplary fraud step gathers cardholder data from the card issuance, authorization, and billing systems and databases stored on either the second or third computing systems 201, 301, and applies such data to the established fraud processing rules (steps 25, 27). If any information provided by the cardholder does not correspond to the provider's system data or otherwise does not comport with the fraud rule processing described previously (step 25) so that the information does not pass the fraud rules (step 27), an online card activation decline message is displayed to the cardholder on first computing system 101 via network $N_1$.

If the information provided does correspond to the provider's system data, the process next allows the second computing system to analyze system data to initially determine whether the required authentication data is available (steps 29, 31). If authentication data is not available on the second computing system 201 (step 31), the second computing system 201 then transmits an online card activation decline message to the cardholder for display on first computing system 101 via network $N_1$. The online card activation decline message may be of any suitable text, but in one embodiment, will notify the cardholder that the card cannot be activated online for any predetermined reason, including, for example, "We cannot process your request at this time. Please call our 1-800 number for further assistance."

Referring to FIG. 3a, if the required authentication data is available, but in one embodiment, prior to authenticating, the process next determines whether the card information corresponds to a card which is already registered in an existing provider service (step 33). Optimally, the existing provider service information can reside on either the second or third computing systems (201, 301), but those of skill in the art will realize that other computing systems coupled to a network $N_x$ can be used.

If the card is not already registered with an existing provider service, the second computing system 201 prompts the cardholder via first computing system 101 for cardholder authentication information as described above and also offers the cardholder an option to enroll in other provider services (step 35). Thereafter, the process proceeds to step 43 as illustrated in FIG. 3.

If the card is already registered with an existing provider service (step 33) (such as "Manage Your Card Account™" located at www.americanexpress.com), the second computing system 201 then prompts the cardholder via first computing system 101 for the cardholder to enter existing service data corresponding to the existing service registration (step 37). The existing service data entered by the cardholder may include a unique user ID and password corresponding to the service. The existing service data is transmitted to the second computing system 201, wherein the second computing system validates the existing service data against service data stored in second computing system 201 (step 39). Similar to step 35 described above, the cardholder is then prompted for cardholder authentication information to authenticate that the cardholder is the person who is supposed to correspond to the card already enrolled in an existing provider service (step 41).

Thus, for example, if the cardholder is presently enrolled in "Manage Your Card Account™" (a service offered by American Express® at www.americanexpress.com), the cardholder to verifies their identity using their corresponding single sign on (SSO) user ID and password. Thereafter, the SSO Logon page is displayed on the first computing system 101. After the user enters their corresponding ID and password, the SSO system validates the entry step 41). Subsequently, the second computing system 201 prompts the cardholder via first computing system 101 for cardholder authentication information (step 41). Thereafter, the process proceeds to step 43 as illustrated in FIG. 3.

The authentication processes described in steps 35 and 41 first determines whether authentication data is available on either second or third computing systems (201, 301), and if so, authenticates that the cardholder is the person who is supposed to correspond to the card (step 43). During this authentication process, for example, authentication is determined by allowing the second computing system 201 to generate questions to the user on the first computing system 101 to verify that the cardholder should be the proper party to possess the card. Thus, for example, the second computing system 201 may ask for the cardholder's date of birth, social security information or like personal information or like identifiers which are already stored in either second or third computing systems (201, 301). A predetermined number of questions or identifiers, and preferably two identifiers, will be selected by the second computing system 201 and displayed to the cardholder on first computing system 101. Those of skill in the art will realize that this selection process can either be implemented in one embodiment as a static selection (e.g., the same identifiers can be used repeatedly) or a dynamic selection (e.g., the second computing system 201 may randomly or specifically select appropriate identifiers). Once answers to the identifiers (or questions posed) are received by the second computing system 201, the second computing system can then process and authenticate the identifiers by comparing such identifiers to the cardholder's account. If the required authentication data is not available (step 31) on the second computing system (e.g., due to a lack of information such as social security number, date of birth, etc.), the second computing system 201 then transmits an online card activation decline message to the cardholder for display on first computing system 101 via network $N_1$. The online card activation decline message may be of any suitable text, but in one embodiment, will notify the cardholder that the card cannot be activated online for any predetermined reason, including, for example, "We cannot process your request at this time. Please call our 1-800 number for further assistance." The authentication step is useful in those situations where the card was accidentally mailed to the wrong address, and thus, the wrong cardholder. This step is also useful to minimize fraud risk associated with the online activation by deterring a person from stealing the inactivated card and later, attempting to activate the card online in accordance with the present invention. If any identifier provided is not valid, an online card activation decline message is displayed to the cardholder on first computing system 101 via network $N_1$.

In one embodiment, during the authentication process (steps 35, 410, a predetermined number of questions relating to the cardholder's personal information or like identifiers (and preferably at least two identifiers) will be selected from a pool of available items based on what data is available on the authorization and billing systems and databases. If one or more identifiers with data available does not exist or cannot be processed, an online card activation decline message is displayed to the cardholder on first computing system 101 via network $N_1$. If data for at least two identifiers is found, a page is presented on the site requesting such identifier data from the cardholder. The data entered by the cardholder is then compared to the system's data to authenticate the user attempting to activate the card is the cardholder.

If the entered data for authentication does not match the system data, an online card activation decline message similar to that described above is displayed to the cardholder on first computing system 101 via network $N_1$ (step 43). Alternatively, if the data matches (step 43), the process will continue with the activation or approval process (step 45). During the approval process, the second computing system 201 approves the card for use by the cardholder, updates its database and corresponding databases and notifies the cardholder of the card approval on the first computing system 101. Optionally, the second computing system 201 may notify the cardholder of approval by communicating the approval to the cardholder's electronic mail address.

The process next determines whether the cardholder requested enrollment in an existing provider service (steps 35, 47). If so, the enrollment request is processed (step 49) and a subsequent online "Thank you." message or like activation confirmation notification message will be generated by the second computing system 201 and transmitted to the first computing system 101. If the cardholder did not request enrollment in an existing provider service, the online "Thank you." message or like activation confirmation notification message will be generated by the second computing system 201 and transmitted to the first computing system 101. Thus, it can readily be seen that if all the identification and authentication steps have been successfully passed, the card is activated for use in the authorization system. The "Thank you" message step may be customized based on the tenure, product and enrollment options of the cardholder. Additionally, if during the activation process, the user/cardholder indicated they would like to enroll in one of the provider's services such as "Manage Your Card Account™" (an option offered, for example, on the first authentication page), the card may suitably be automatically and systematically registered in the existing provider service such as the Manage Your Card Account™. This registration will then be confirmed on the "thank you" page or like page displayed on the site when applicable.

Referring now to FIG. 4, when an error is detected as described in any of the foregoing processes, the second computing system 201 presents, on the first computing system 101, the cardholder with the option of, for example, either telephonically calling a voice recognition response system or contacting the provider's representative through online, real time interactive communication (step 51). If the cardholder decides to call, a telephone number (such as for example a 1-800 number) is displayed on the first computing system 101 from the site on the second computing system 201. If the cardholder decides to engage in an interactive communication dialog with the provider, the second computing system 201 displays a dialog window to the cardholder on the web site (via first computing system 101) and attempts to make a similar communication connection with a provider representative (step 53). The second computing system 201 then functions as a communication intermediary to allow real-time interactive communication between the cardholder and the provider's on-line representative to authenticate and/or validate the issued card or otherwise communicate with the cardholder in real time (step 55).

As will be fully appreciated by those of skill in the art, in an exemplary embodiment, the present invention is configured to deliver the following exemplary system functions: create a new online network site for any consumer or cardholder that upon successful completion of the present invention, the ability for the cardholder to either activate the card; provide the ability for the cardholder to access the site directly or through linkages or hyperlinkages from other host sites; develop an infrastructure that is flexible/expandable to support future growth and changing business needs (e.g., the present invention is intended to support both existing and future card products, and existing and future fraud prevention rules, etc.); perform validation/authentication checks on cardholder supplied data by the use of one or more data sources; offer enrollment to cardholders on cards not already registered in Manage Your Card Account™ (which is described in more detail at www.americanexpress.com); provide data tracking capabilities to produce reports that monitor site traffic performance, business goals and potential fraud activities; provide the cardholder access to the provider's customer service via online chat; and also provide electronic mail confirmation capability.

The present invention provides several advantages for both the card provider as well as the cardholder. For example, the provider may gain a significant financial benefit by decreasing the costs associated with traditional card activation methodologies through either the voice response or customer service (either the TSC or CFS channel). Further, the provider is given the opportunity to cross-sell additional products and/or services while communicating promotional offers through various links within the host (i.e., American Express) web site. In similar fashion, the cardholder is provided with positive satisfaction by the present invention, which allows a convenient, and possibly preferred, channel for cardholders to activate their card. Further, use of an online activation mechanism increases cardholder satisfaction and reduces the demand for card activations currently being processed manually by a customer service representative or through the voice response system. It is expected that the present invention will be used by a certain percentage of all cardholders for activating their cards, producing a reduction of between $2 and $3 per card activation. The cost reduction for activating is based upon, for example, the cost reduction for activating cards online over the current channels, the incremental revenue produced by customers that act on the cross-sell offers that are presented to them during the online activation process, and the increased customer satisfaction over a process that is more convenient, accessible, simple, and seamless in its use.

As such, the present invention addresses a need for managing risk and fraud for newly issued plastic. The present invention is able to integrate fraud detection as three discrete layers or processes to assure the identity of the user, while providing a convenient, low cost, online method for customers to activate their cards. The present invention also optimizes and maximizes the interaction with the customer to extend the provider's relationship and opportunity with the customer cardholder. The ability to integrate cross-sell opportunities while the customer is activating their card is likely to increase enrollment in the services that are being exposed to the customer.

An exemplary embodiment of the present invention includes the integration of the fraud detection capabilities into an online platform that provides an acceptable level of risk.

The fraud detection capabilities are comparable to those offered in typical card activation systems. There will always be instances where the online system cannot complete the activation. Some of these are operational in nature, but many are rule based as defined in the fraud detection function. Instead of redirecting the user to call a phone number as most prior art systems would require, the present invention enables an immediate and interactive online chat with a customer service representative that is convenient, simple and seamless for the user and their online experience.

The present invention provides a completely integrated solution for the cardholder user. Using the new online site, all or a predetermined number of the requisite rules and verifications are applied to each user request. The goal is that a card can be activated without any external intervention, but if required, the present invention will establish an immediate and integrated online chat session with a provider's customer service representative. This process or method produces an experience that is complete (no redirecting of inquiries), effortless and seamless.

Moreover, the present invention looks to integrate the card activation process into the larger customer interaction with the issuer, by providing links to other areas of interest within the web-site. This includes an integrated cross-sell capability that reacts to the relationship that exists with the customer (the issuer can minimize providing offers for products and services previously obtained by the cardmember).

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, XML, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneier which is entitled "Applied Cryptography: Protocols, Algorithms, And Source Code In C," published by John Wiley & Sons (second edition, 1996), which is hereby incorporated by reference as background.

It should be appreciated that the particular implementations shown and described herein are illustrative of the invention and its best mode, and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference as background.

Without limitation, cardholders, issuers and merchants systems and servers are suitably coupled to a network via data links. A variety of conventional communications media and protocols may be used for data links, such as, for example, a connection to an Internet Service Provider (ISP) over the local loop as is typically used in connection with standard modem communication, cable modem, dish networks, ISDN, Digital Subscriber Line (DSL), or various wireless communication methods. A representative merchant system might also reside within a local area network (LAN) which interfaces to a network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference as background.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The customer and merchant may represent individual people, entities, or business. Although discussed as a card issuer, the card issuer may represent other types of banks or card issuing institutions, such as credit card companies, card sponsoring companies, or third party issuers under contract with financial institutions. It is further noted that other participants may be involved in some phases of the transaction, such as an intermediary settlement institution, but these participants are not shown.

The computing units are connected with each other via a data communication network. The network may be a public network and assumed to be insecure and open to eavesdroppers. In the illustrated implementation, the network is embodied as the Internet. In this context, the computers may or may not be connected to the Internet at all times. For instance, the customer computer may employ a modem to occasionally connect to the Internet, whereas the bank computing center might maintain a permanent connection to the Internet. It is noted that the network may be implemented as other types of networks, such as an interactive television (ITV) network.

The third computing system 301 and the second computing system 201 are in one embodiment interconnected via a second network, referred to, for example, as a payment network. The payment network represents existing proprietary networks that presently accommodate transactions for credit cards, debit cards, and other types of financial/banking cards. The payment network is a closed network that is assumed to be secure from eavesdroppers. Examples of representative payment networks include the American Express®, VisaNet® and the Veriphone® network.

The electronic commerce system is implemented at the customer and issuing bank. In an exemplary implementation, the electronic commerce system is implemented as computer software modules loaded onto the customer computer and the banking computing center. The third computing system may not require any additional software to participate in the online commerce transactions supported by the online commerce system.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for processing a card through a computer network, the steps comprising:
   a) providing a notice to a consumer to activate a card on a site on first computing system in communication with a second computing system over a first network;
   b) instructing the consumer to access the site;
   c) prompting the consumer to provide predetermined card information, personal information for use in identifying the consumer, and authentication and service data, when available, to the site and communicating the predetermined card information to the second computing system over the first network;
   d) processing, by the second computing system, the predetermined card information, the personal information, and authentication and service data, when available against previously stored account data in order to activate the card and generating processing results; and
   e) notifying the consumer on the first computing network of the processing results,
   wherein the authentication and service data includes information in addition to and different from information identifying the consumer, and wherein the personal information is different from the predetermined card information.

2. The method of claim 1 further comprising the step of providing at least a third computing system in communication with the second computing system over a second network.

3. The method of claim 2, the first network being a global computer network and the second network being a global computer network.

4. The method of claim 3, the first network and the second network being configured to transmit data by a transmission means, the transmission means selected from the group consisting of wire transmission, wireless transmission, satellite transmission, radio frequency transmission, cable transmission, digital signal subscriber transmission and fiber optic transmission.

5. The method of claim 4, the global computer network being the Internet.

6. The method of claim 5, the first computing system being a personal computer.

7. The method of claim 2, the notice corresponding to a new card notice, a renewal card notice or a replacement card notice.

8. The method of claim 2, the method further comprising the step of allowing the second computing system to generate an online card activation decline message to the consumer on the first computing system if the card cannot be activated for any predetermined reason, presenting to the consumer on the first computing system the option of manually calling the provider and the option of interactively communicating with the provider on the first computing system.

9. The method of claim 2, the step of allowing the second computing system to process the predetermined card information further comprising the step of processing the predetermined card information by fraud rule processing.

10. The method of claim 9 further comprising the step of allowing the second computing system to determine whether the consumer is a member of an existing provider service by prompting the consumer to submit service identification data to the second computing system, allowing the second computing system to validate the service identification data and authenticate the existing provider service if the consumer's membership is valid, and notifying the consumer on the first computing network of the second computing system's provider service authentication results.

11. A method of activating a card through a global computer network comprising the steps of:
   a) issuing a notice to a cardholder to activate a card on a first computing system in communication with the global computer network by a first network;
   b) promoting the cardholder to use the first computing system to access a site on a second computing system on the global computer network;

c) prompting the cardholder to provide predetermined card information, personal information for use in identifying the cardholder, and authentication and service data, when available, to the site and communicating the predetermined card information, and authentication and service data, when available, to the global computer network through the first network;

d) allowing the global computer network to process the predetermined card information and the personal information to generate activation results; and e) transmitting the activation results to the cardholder on the first computing network, wherein the authentication and service data includes information in addition to and different from information identifying the cardholder, and wherein the personal information is different from the predetermined card information.

12. The method of claim 11, the global computer network being the Internet.

13. The method of claim 12, the method further comprising the step of allowing the second computing system to generate an online card activation decline message to the cardholder on the first computing system if the card cannot be activated and presenting to the cardholder on the first computing system the option of manually calling the provider and the option of interactively communicating with the provider on the first computing system.

14. The method of claim 13, the step of allowing the second computing system to process the predetermined card information further comprising the step of processing the predetermined card information by fraud processing rules.

15. The method of claim 14 further comprising the step of allowing the second computing system to determine whether the cardholder is a member of an existing provider service by allowing the second computing system to determine whether the cardholder is a member of an existing provider service further comprising the steps of prompting the cardholder to submit service identification data to the second computing system, allowing the second computing system to validate the service identification data and authenticate the existing provider service if the cardholder's membership is valid, and notifying the cardholder on the first computing network of the second computing system's provider service authentication results.

16. A method of activating a financial transaction card through a provider site on a global computer network, the method comprising the steps of:

a) providing a cardholder-accessible network having an interactive card activation web site in communication with a cardholder's computer system;

b) instructing the cardholder to access the web site through the computer system and provide predetermined card information, personal information for use in identifying the cardholder, and authentication and service data, when available, corresponding to the cardholder's account with the provider;

c) allowing the computer system to process the predetermined card information, the personal information, and authentication and service data, when available, through the global computer network to a second computing system, the second computing system processing the predetermined card information and generating activation results; and d) transmitting the activation results to the cardholder over the first computing network to the computing system, wherein the authentication and service data includes information in addition to and different from information identifying the cardholder, and wherein the personal information is different from the predetermined card information.

17. The method of claim 16, the site further receiving from the computer system a cardholder's name, account number and card identification number as part of the predetermined card information, the web site further storing the card information and processing the card information for activation, fraudulent entries, erroneous entries, and further performing validation checks on cardholder supplied data, performing dynamic authentication processing on cardholder supplied data, utilizing a cardholder's electronic mail address for transmitting the activation results and generating at least one hyperlink on the computer system corresponding to related provider card services.

18. The method of claim 17 further comprising the step of providing at least a third computing system in communication with the second computing system over a second network.

19. The method of claim 18, the step of generating activation results further comprising the step of allowing the second computing system to process the predetermined card information against previously stored account data in order to activate the card defining processing results.

20. The method of claim 19, the method further comprising the step of allowing the second computing system to generate an online card activation decline message to the cardholder on the first computing system if the card cannot be activated.

21. The method of claim 20, the step of allowing the second computing system to process the predetermined card information further comprising the step of processing the predetermined card information by fraud processing rules.

22. The method of claim 21 further comprising the step of allowing the second computing system to determine whether the cardholder is a member of an existing provider service by prompting the cardholder to submit service identification data to the second computing system, allowing the second computing system to validate the service identification data and authenticate the existing provider service if the cardholder's membership is valid, and notifying the cardholder on the first computing network of the second computing system's provider service authentication results.

23. A method for activating a card through a computer network, the steps comprising:

a) prompting a cardholder to provide predetermined card information, personal information for use in identifying the cardholder, and authentication and service data, when available, to a site on a first computing system in communication with a second computing system over a first network and communicating the predetermined card information, and authentication and service data, when available, to the second computing system over the first network;

b) processing, by the second computing system, the predetermined card information, the personal information, and authentication and service data, when available, against previously stored account data in order to activate the card defining processing results; and c) notifying the cardholder on the first computing network of the processing results, wherein the authentication and service data includes information in addition to and different from information identifying the cardholder, and wherein the personal information is different from the predetermined card information.

24. The method of claim 23, the site further receiving from the first computing system the cardholder's name, account number and account identification number as part of the predetermined card information, the site further storing the card information and processing the card information for activation, fraudulent entries, erroneous entries, and further performing dynamic validation processing on cardholder supplied data, performing authentication processing on cardholder supplied data, utilizing a cardholder's electronic mail address for transmitting the activation results and generating at least one hyperlink on the computer system corresponding to related provider card services.

25. The method of claim 24, the method further comprising the steps of allowing the second computing system to generate an online card activation decline message to the cardholder on the first computing system if the card cannot be activated and presenting to the cardholder on the first computing system the option of manually calling the provider and the option of interactively communicating with the provider on the first computing system.

26. The method of claim 25 further comprising the step of allowing the second computing system to determine whether the cardholder is a member of an existing provider service by prompting the cardholder to submit service identification data to the second computing system, allowing the second computing system to validate the service identification data and authenticate the existing provider service if the cardholder's membership is valid, and notifying the cardholder on the first computing network of the second computing system's provider service authentication results.

27. A method for activating a financial card through a computer network, the steps comprising:
a) entering predetermined card information, personal information for use in identifying a cardholder, and authentication and service data, when available, on a first computing system into a site on at least one second computing system, the first computing system in communication with the second computing system over a first network; and
b) receiving activation results on the first computing system from the second computing system, the activation results generated by the second computing system by processing the predetermined card information, the personal information, and authentication and service data, when available,
wherein the authentication and service data includes information in addition to and different from information identifying a cardholder for the financial card, and wherein the personal information is different from the predetermined card information.

28. The method of claim 27, the activation results further being generated by the second computing system by processing the predetermined card information against previously stored account data in order to activate the card.

29. The method of claim 28, the method further comprising the step of allowing the second computing system to generate an online card activation decline message to the cardholder on the first computing system if the card cannot be activated.

30. A method for activating a card by a cardholder through a first computing system in communication with a second computing system over a computer network, the method comprising the steps of:
a) offering a notice to the cardholder to activate the card on the first computing system and allowing the cardholder to access an site generated by the second computing system, the site located on the computer network;
b) prompting the cardholder to provide predetermined card information, personal information for use in identifying the cardholder, and authentication and service data, when available, to the site and communicating the card information to the second computing system via the computer network;
c) allowing the second computing system to process the card information, the personal information, and authentication and service data, when available, by comparing the card information to previously stored account data;
d) evaluating whether the card information, and authentication service data, when available, passes predetermined fraud processing rules;
e) determining whether the card information corresponds to a pre-existing provider service;
f) authenticating the card if the card information, and authentication and service data, when available, passes predetermined fraud processing rules;
g) generating activation results based on any of steps c-f; and
h) notifying the cardholder on the first computing system of the activation results,
wherein the authentication and service data includes information in addition to and different from information identifying the cardholder, and wherein the personal information is different from the predetermined card information.

31. The method of claim 30, the method further comprising the step of allowing the second computing system to generate an online card activation decline message to the cardholder on the first computing system if the card cannot be activated for any predetermined reason, and allowing the second computing system to generate a card already activated message to the cardholder on the first computing system if the card is determined by the second computing system to have already been activated.

32. The method of claim 31, the fraud processing rules further comprising the steps of gathering cardholder data from card issuance, authorization, and billing systems and databases accessible by the second computing system, applying the cardholder data to the fraud processing rules, displaying an online card activation decline message to the cardholder on the first computing system if the information provided by the cardholder does not correspond to the provider's system data, analyzing system data to initially determine whether the authentication data is available, and if authentication data is available, transmitting predetermined questions to the first computing system for display to the cardholder to authenticate that the cardholder corresponding to the card by predetermined identifiers.

33. The method of claim 32 further comprising the steps of allowing the second computing system to prompt the cardholder via first computing system for cardholder authentication information if the card is not already registered.

34. The method of claim 33 further comprising the steps of allowing the second computing system to offer the cardholder on the first computing system an option to enroll in other provider services, allowing the second computing system to prompt the cardholder via first computing system for the cardholder to enter existing service data corresponding to the existing service registration, transmitting the existing service data to the second computing system and allowing the second computing system to validate the existing service data against service data stored in second computing system.

35. A method of activating a device through a provider site on a global computer network, the method comprising the steps of:

a) providing a consumer-accessible network having an interactive device activation web site in communication with a consumer's computer system;

b) instructing the consumer to access the web site through the computer system and provide predetermined device information, personal information for use in identifying the consumer, and authentication and service data, when available, corresponding to the consumer's account with the provider;

c) allowing the computer system to process the predetermined device information, the personal information, and authentication and service data, when available, through the global computer network to a second computing system, the second computing system processing the predetermined device information, and authentication and service data, when available, and generating activation results; and d) transmitting the activation results to the consumer over the first computing network to the computing system, wherein the authentication and service data includes information in addition to and different from information identifying the consumer, and wherein the personal information is different from the predetermined device information.

36. The method of claim 35, the global computer network being the Internet.

37. The method of claim 36, the method further comprising the steps of allowing the second computing system to generate an online device activation decline message to the consumer on the first computing system if the device cannot be activated and presenting to the consumer on the first computing system the option of manually calling the provider and the option of interactively communicating with the provider on the first computing system.

38. The method of claim 37, the step of allowing the second computing system to process the predetermined device information further comprising step of processing the predetermined device information by fraud processing rules.

39. The method of claim 38 further comprising the steps of allowing the second computing system to determine whether the consumer is a member of an existing provider service further comprising the steps of prompting the consumer to submit service identification data to the second computing system, allowing the second computing system to validate the service identification data and authenticate the existing provider service if the consumer's membership is valid, and notifying the consumer on the first computing network of the second computing system's provider service authentication results.

40. The method of claim 38, the site further receiving from the computer system a consumer's name, account number and account identification number as part of the predetermined device information, the web site further storing the device information and processing the device information for activation, fraudulent entries, erroneous entries, and further performing validation processing on consumer supplied data and performing dynamic authentication processing on consumer supplied data.

41. The method of claim 40, the site further utilizing a consumer's electronic mail address for transmitting the activation results and generating at least one hyperlink on the computer system corresponding to related provider card services.

42. The method of claim 40, the device being a financial instrument.

43. The method of claim 40, the device being a cellular phone.

44. The method of claim 40, the device being a transponder.

45. A method of activating a consumer account through a provider site on a global computer network, the method comprising the steps of:

a) providing a consumer-accessible network having an interactive account activation web site in communication with the consumer's computer system;

b) instructing the consumer to access the web site through the computer system and provide predetermined account information corresponding to the consumer's account with the provider, the account information including card information, personal information for use in identifying the consumer, and authentication and service data, when available;

c) allowing the computer system to process the predetermined account information through the global computer network to a second computing system, the second computing system processing the predetermined account information and generating activation results; and d) transmitting the activation results to the consumer over the first computing network to the computing system, wherein the authentication and service data includes information in addition to and different from information identifying the consumer, and wherein the personal information is different from the card information.

46. The method of claim 45, the global computer network being the Internet.

47. The method of claim 46, the method further comprising the steps of allowing the second computing system to generate an online account activation decline message to the consumer on the first computing system if the account cannot be activated and presenting to the consumer on the first computing system the option of manually calling the provider and the option of interactively communicating with the provider on the first computing system.

48. The method of claim 46, the step of allowing the second computing system to process the predetermined account information further comprising the step of processing the predetermined account information by fraud processing rules.

* * * * *